United States Patent
de Queiroz et al.

(10) Patent No.: US 7,391,901 B2
(45) Date of Patent: Jun. 24, 2008

(54) METHOD FOR EMBEDDING COLOR IMAGE INFORMATION INTO A BLACK-AND-WHITE IMAGE

(75) Inventors: Ricardo L. de Queiroz, Brasilia (BR); Karen M. Braun, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 913 days.

(21) Appl. No.: 10/674,048

(22) Filed: Sep. 29, 2003

(65) Prior Publication Data
US 2005/0069197 A1 Mar. 31, 2005

(51) Int. Cl.
*G06K 9/00* (2006.01)

(52) U.S. Cl. .................. 382/166; 382/162; 382/240; 382/276

(58) Field of Classification Search ................ 382/166, 382/281, 248, 251, 235, 240, 253, 261, 276, 382/162; 375/240.19, 240.11, E7.049, E7.053, 375/E7.072, E7.209; 348/395.1, 398.1, 403.1, 348/406.1, 422.1; 358/426.01; 345/604
See application file for complete search history.

(56) References Cited

U.S. PATENT DOCUMENTS

| | | | | |
|---|---|---|---|---|
| 6,125,201 | A * | 9/2000 | Zador | 382/166 |
| 6,154,493 | A * | 11/2000 | Acharya et al. | 375/240.19 |
| 6,516,030 | B1 | 2/2003 | Lynch et al. | 375/240.11 |
| 6,788,811 | B1 * | 9/2004 | Matsuura et al. | 382/166 |
| 6,865,291 | B1 * | 3/2005 | Zador | 382/166 |

OTHER PUBLICATIONS

De Queiroz, "On Independent Color Space Transformations for the Compression of CMYK Images", IEEE, vol. 8, No. 10, Oct. 1999, pp. 1446-1451.*

* cited by examiner

*Primary Examiner*—Anh Hong Do (57) ABSTRACT

A method is disclosed for converting color images to textured monochrome images such that image regions with similar luminance but different chrominance look different when converted to black-and-white to preserve color information therein. This texture-encoded color information can be extracted at a later time to reconstitute the original color image. The present method involves first converting the color image to a luminance-chrominance colorspace. The chrominance data is decomposed into 4 channels of chrominance. A wavelet transformation of the luminance channel is preformed. Scaled chrominance channels are then mapped to a number of wavelet sub-bands. Once mapped, the wavelet transform is inverted to generate textures proportional to the original colors of the color image having an amplitude proportional to the chroma of the original color. The black-and-white image is embedded with this texture information into the image's grayscale component. In order to retrieve the color image from the textured grayscale image, a wavelet transform regenerates the scaled chrominance channels mapped therein. Those wavelet sub-bands comprising embedded chroma are extracted and scaled to the size of the original image. The remaining sub-bands are inverted to produce the Y-image thereof. Separate images now exist in Y, Cr, and Cb. The recombination of the YCbCr images produce the colored image that was previously embedded into the grayscale components of the textured black-and-white image.

34 Claims, 11 Drawing Sheets

METHOD FOR EMBEDDING COLOR IMAGE INFORMATION INTO A BLACK-AND-WHITE IMAGE

FIELD OF THE INVENTION

The present invention generally relates to methods for converting color images to black-and-white images and, more particularly, to methods for embedding texture information into a color image's black-and-white reproduction to enable the conversion of the black-and-white image back into the color image.

BACKGROUND OF THE INVENTION

When color images are printed on black-and-white printing devices the color information contained in the original image has to be converted or otherwise mapped to black-and-white. This has to be achieved in a manner wherein sufficient color information comprising the color image is retained in the derivative black-and-white image such that the image itself is not lost in the recomposition. Since regions of different color having a similar lightness look about the same, subtle color differences in the original color image can be difficult to distinguish in the resultant black-and-white image. In some instances, this inability to distinguish color differences can compromise the content of the original picture and thereby compromise one's understanding of the resulting graphic or chart.

Colors are generally mapped to textures in order to impose some degree of differentiability other than the density of toner (luminance). Different colors should produce different textures which should be more readily discernible. Methods approach this problem by mapping colors to one or more texture patterns. Alternatively, only primary colors are mapped to texture patterns so that the combinations of primary colors end up being mapped to combinations of texture patterns.

As wavelet theory is important to an understanding of the subject matter of the present invention, the following additional background is provided.

It is well known from Fourier theory that a signal can be expressed as the sum of a, possibly infinite, series of sines and cosines. This sum is also referred to as a Fourier expansion. A disadvantage of a Fourier expansion is that it has only frequency resolution and no time resolution meaning that, although all the frequencies present in a signal might be determinable, one does not know when they are present. To overcome this problem, several solutions have been developed which are more or less able to represent a signal in the time and frequency domain at the same time.

The idea behind time-frequency joint representations is to cut the signal of interest into several parts and then analyze the parts separately. It is clear that analyzing a signal this way will give more information about the when and where of different frequency components, but it often leads to a fundamental problem as well: How to cut the signal? Herein lies the problem. Suppose that we want to know exactly all the frequency components present at a certain moment in time. This short time window is cut using a Dirac pulse (f(t)=1 at t=0 and f(t)=0 for all other t), then transform it to the frequency domain.

One problem is that cutting the signal corresponds to a convolution between the signal and the cutting window. Since convolution in the time domain is identical to multiplication in the frequency domain and since the Fourier transform of a Dirac pulse contains all possible frequencies then the frequency components of the signal begin to smear over the frequency axis. This is the opposite of the standard Fourier result as we now have time resolution but no frequency resolution whatsoever. The underlying principle of this problem is due to Heisenberg's uncertainty principle which states, in part, that it is impossible to know the exact frequency and the exact time of occurrence of this frequency in a signal. As such, a signal can not be represented as a point in the time-frequency space.

The wavelet transform or wavelet analysis is one solution to overcome the shortcomings of a Fourier transform. In wavelet analysis, the use of a fully scalable modulated window helps resolve the signal-cutting problem because, as the window is shifted along the signal, the spectrum is calculated for every position. As this process is iterated with a slightly shorter (or longer) window for every cycle, a collection of time-frequency representations of the signal, all with different resolutions, a multi-resolution analysis results.

In the case of wavelets, one does not speak of time-frequency representations but rather time-scale representations, wherein scale is the opposite of frequency as used for Fourier transforms. The large scale is considered the big picture, while the small scales show the details. In a way, going from large scale to small scale is like zooming in on the details.

Brief Wavelet Transformation Theory

The wavelet transformation preferred herein is the Continuous Wavelet Transform (CWT) as described more formally as:

$$\gamma(s,\tau) = \int f(t)\psi^*_{s,\tau}(t)dt \qquad (1)$$

where * denotes complex conjugation. This equation shows how a function f(t) is decomposed into a set of basis functions, called wavelets. The variables s and $\psi_{s,\tau}(t)$, scale and translation, are the new dimensions after the wavelet transform. The wavelet transform (1) is calculated by continuously shifting a continuously scalable function over a signal and calculating the correlation between the two. As such, the wavelets themselves are generated by:

$$\psi_{s,\tau}(t) = \frac{1}{\sqrt{s}} \psi\left(\frac{t-\tau}{s}\right) \qquad (2)$$

where s is the scale factor, τ is the translation factor and s–½ is for energy normalization across the different scales.

An admissibility condition is used to analyze and reconstruct a signal without loss of information is satisfied by the square integrable functions Ψ(t), as:

$$\int \frac{|\Psi(\omega)|^2}{|\omega|} d\omega < +\infty \qquad (3)$$

where Ψ(ω) is the Fourier transform of ψ(t). The admissibility condition implies that the Fourier transform of ψ(t) vanishes at the zero frequency, i.e., that wavelets must have a band-pass like spectrum. Thus:

$$|\Psi(\omega)|^2|_{\omega=0} = 0 \qquad (4)$$

A zero at the zero frequency means that the average value of the wavelet in the time domain must be zero, and thus oscillatory. In other words, ψ(t) must be a wave.

$$\int \psi(t) dt = 0 \tag{5}$$

The CWT maps a one-dimensional signal to a two-dimensional time-scale joint representation that is highly redundant. The time-bandwidth product of the CWT is the square of that of the signal and, for most applications, is inefficient. Discrete wavelets overcome this problem because they can only be scaled and translated in discrete steps. By modifying the wavelet in (2), we get:

$$\psi_{j,k}(t) = \frac{1}{\sqrt{s_0^j}} \psi\left(\frac{t - k\tau_0 s_0^j}{s_0^j}\right) \tag{6}$$

wherein, j and k are integers and $s_0 > 1$ is a fixed dilation step. The translation factor $\tau_0$ depends on the dilation step.

When discrete wavelets are used to transform a continuous signal, the result is a series of wavelet coefficients referred to as the wavelet series decomposition. The effect of discretizing the wavelet is that the time-scale space is now sampled at discrete intervals. Usually $s_0 = 2$ is chosen so that the sampling of the frequency axis corresponds to dyadic sampling. For the translation factor, usually $\tau_0 = 1$ in order to have dyadic sampling of the time axis.

Figure 7:
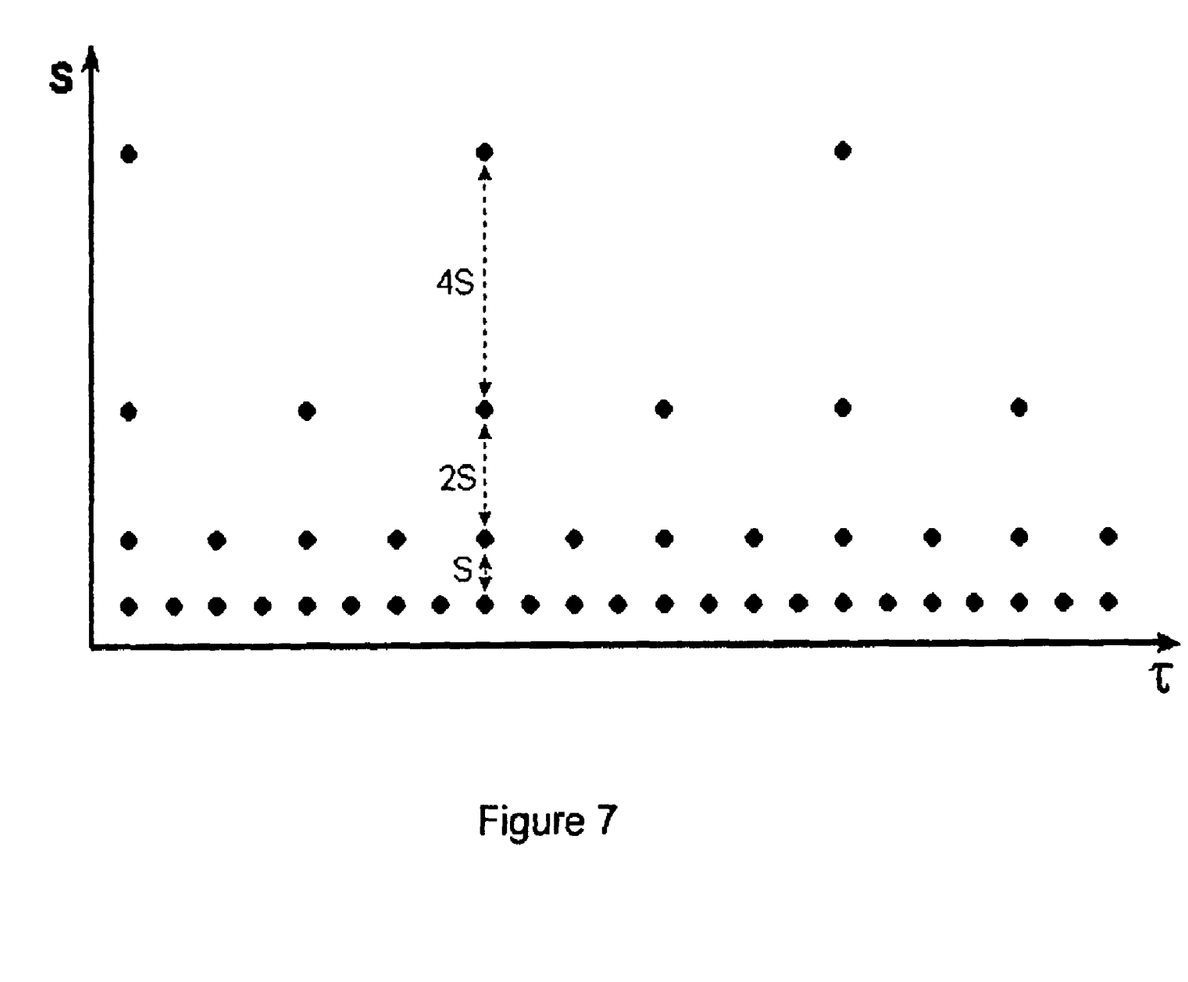
FIG. 7 illustrates the localization of the discrete wavelets in the time-scale space on a dyadic grid.

FIG. 7 illustrates the localization of the discrete wavelets in the time-scale space on a dyadic grid.

An important issue of decomposition is reconstruction. Signals can be reconstructed from its wavelet series decomposition because the energy of the wavelet coefficients lies between two positive bounds, such that:

$$A\|f\|^2 \le \sum_{j,k} |\langle f, \psi_{j,k}\rangle|^2 \le B\|f\|^2 \tag{7}$$

where $\|f\|^2$ is the energy of f(t), A>0, B<∞ and A,B are independent of f(t).

The discrete wavelets can be made orthogonal to their own dilations and translations, which means:

$$\int \psi_{j,k}(t) \psi_{m,n}^*(t) dt = \begin{cases} 1 & \text{if } j = m \text{ and } k = n \\ 0 & \text{otherwise} \end{cases} \tag{8}$$

An arbitrary signal can be reconstructed by summing the orthogonal wavelet basis functions, weighted by the wavelet transform coefficients:

$$f(t) = \sum_{j,k} \gamma(j,k) \psi_{j,k}(t) \tag{9}$$

which shows the inverse wavelet transform for discrete wavelets.

In (4), the wavelet has a band-pass like spectrum. From Fourier theory, compression in time is equivalent to stretching the spectrum and shifting it upwards:

$$F\{f(at)\} = \frac{1}{|a|} F\left(\frac{\omega}{a}\right) \tag{10}$$

Figure 8:
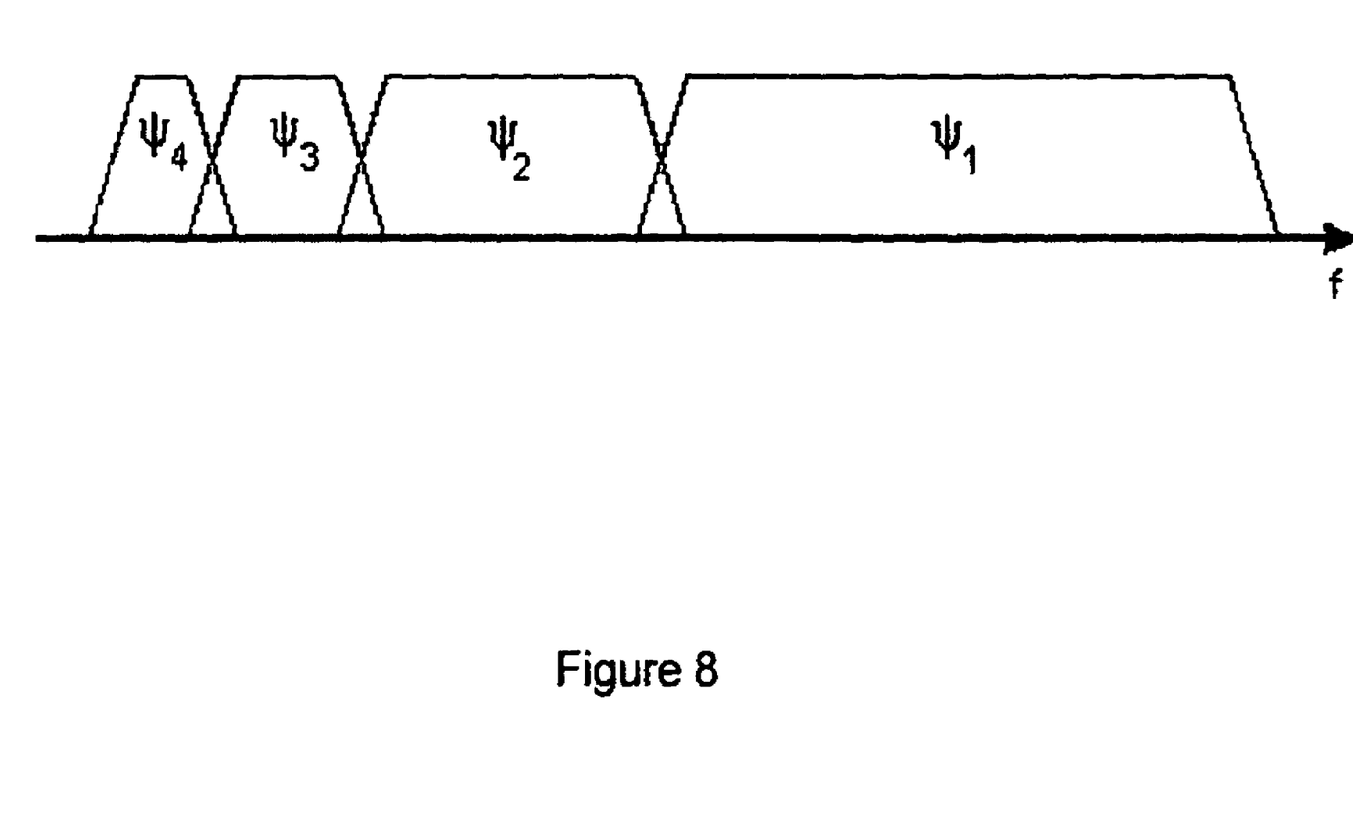
FIG. 8 illustrates an example of a stretched wavelet spectra.

In other words, a time compression of the wavelet by a factor of 2 stretches the frequency spectrum of the wavelet by a factor of 2 and shifts all frequency components up by a factor of 2. Using this, the finite spectrum of a signal is covered with the spectra of dilated wavelets in the same way our signal in the time domain is covered with translated wavelets. To get good coverage of the signal spectrum, the stretched wavelet spectra should touch each other, as shown in FIG. 8. This can be arranged by correctly designing the wavelets.

As a result, a series of dilated wavelets can be seen as a band-pass filter bank. The ratio between the center frequency of a wavelet spectrum and the width of this spectrum is the same for all wavelets and is the fidelity factor Q of a filter and, in the case of wavelets, is a constant-Q filter bank.

When the signal has infinite energy it will be impossible to cover its frequency spectrum and its time duration with wavelets. Usually this constraint is formally stated as:

$$\int_0^\infty |f(t)|^2 dt < \infty \tag{11}$$

This means that the L2-norm of signal f(t) is finite. Thus, natural signals normally have finite energy.

If the scaling function is thought of as just a signal with a low-pass spectrum, it can be decomposed into wavelet components and expressed as:

$$\varphi(t) = \sum_{j,k} \gamma(j,k) \psi_{j,k}(t) \tag{12}$$

Figure 9:
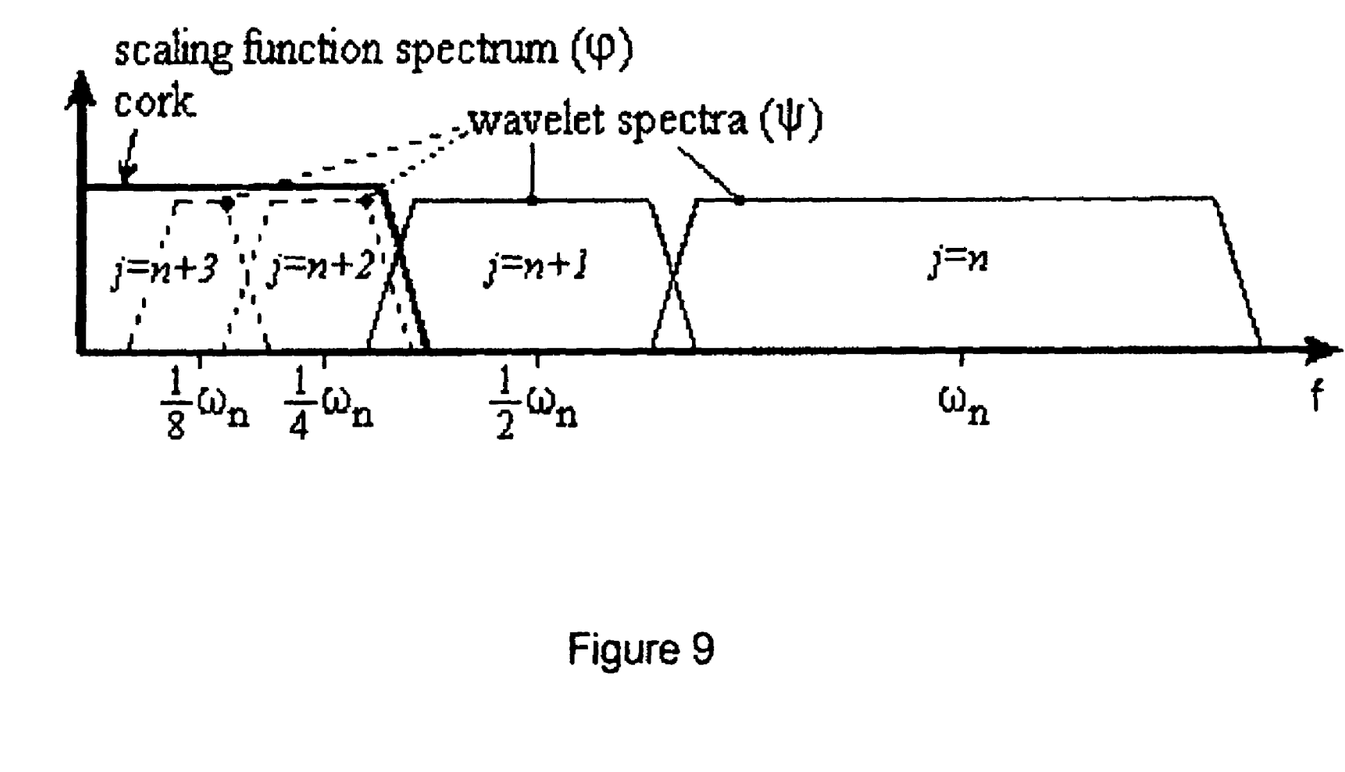
FIG. 9 illustrates the scaling function φ(t) in such a way that its spectrum is neatly fitted in the space left open by the wavelets.

Since the scaling function Ψ(t) is selected in such a way that its spectrum is neatly fitted in the space left open by the wavelets, (12) uses an infinite number of wavelets up to a certain scale j, as shown in FIG. 9.

This means that if a signal is analyzed using the combination of scaling function and wavelets, the scaling function by itself takes care of the spectrum otherwise covered by all the wavelets up to scale j, while the rest is done by the wavelets themselves. Thus, the number of wavelets reduces to a finite number.

By introducing the scaling function, the problem of having an infinite number of wavelets is circumvented and a lower bound for the wavelets is set. Of course a scaling function, instead of wavelets, results in information being lost. However, from a signal representation standpoint, no information was lost since it is still be possible to reconstruct the original signal as will be shown. But, from a wavelet-analysis standpoint valuable scale information gets discarded. The width of the scaling function spectrum is therefore an important parameter in the wavelet transform design. The shorter its spectrum the more wavelet coefficients and the more scale information. But there are limitations on the number of wavelet coefficients one can handle. However, in the Discrete Wavelet Transform (DWT) this problem is more or less automatically solved.

The low-pass spectrum of the scaling function allows the admissibility condition to be re-stated, similar to (5), as:

$$\int \phi(t)dt = 1 \qquad (13)$$

This relationship shows that the 0-th moment of the scaling function cannot vanish. (If the degrees of freedom in a wavelet transform design are not only used on creating vanishing moments for the wavelet, but are equally distributed among the scaling function and the wavelet to create vanishing moments for both functions, we have Coiflets.)

Therefore, if one wavelet can be seen as a band-pass filter and a scaling function is a low-pass filter, then a series of dilated wavelets together with a scaling function can be seen as a filter bank.

If the wavelet transform can be regarded as a filter bank, then wavelet transforming a signal can be regarded as passing the signal through this filter bank. Analyzing a signal by passing it through a filter bank is known as sub-band coding. The outputs of the different filter stages are the wavelet transform coefficients and the scaling function transform coefficients.

The filter bank needed in sub-band coding can be constructed in several ways. One is to build many band-pass filters to split the spectrum into frequency bands. The advantage of this is that the width of every band can be chosen in such a way that the spectrum of the signal to analyze is covered in the places where it might be interesting. The disadvantage is that every filter has to be designed separately. Another is to split the signal spectrum into two equal parts, a low-pass and a high-pass part. The high-pass part contains the smallest details (granularity) of interested and we stop here. We now have two bands. However, the low-pass part still contains some details and therefore can split it again and again, until we are satisfied with the number of bands created. In this way, an iterated filter bank is created. The advantage is that we have to design only two filters. The disadvantage is that the signal spectrum coverage is fixed.

Figure 10:
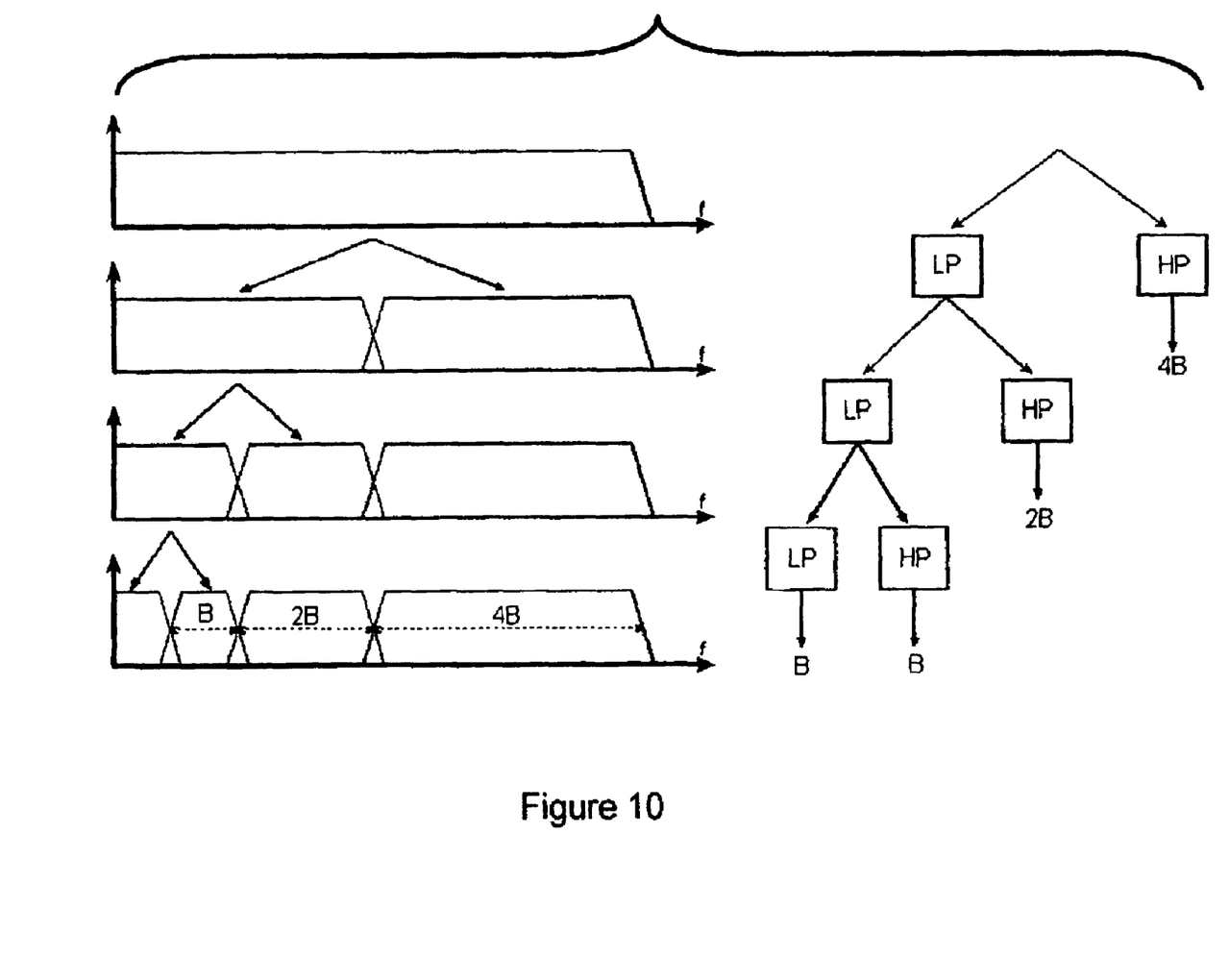
FIG. 10 graphically illustrates the process of splitting the spectrum.

The process of splitting the spectrum is illustrated graphically in FIG. 10.

What remains after the repeated spectrum splitting is a series of band-pass bands with doubling bandwidth and one low-pass band. (Although in theory the first split produced a high-pass band and a low-pass band, in reality the high-pass band is a band-pass band due to the limited bandwidth of the signal.) The same sub-band analysis is performed by feeding the signal into a bank of band-pass filters of which each filter has a bandwidth twice as wide as his left neighbor (the frequency axis running left to right) and a low-pass filter. The wavelets give the band-pass bands with doubling bandwidth and the scaling function provides the low-pass band. The wavelet transform becomes a sub-band coding schema using a constant-Q filter bank (although not restricted to constant-Q filter banks). If the wavelet transform is implemented as an iterated filter bank, the wavelets do not have to be specified explicitly.

In order to use the results achieved with a discrete signal, the wavelet transform must be made discrete (discrete wavelets are not time-discrete, only the translation and the scale step are discrete).

Given, in (12), a scaling function expressed in wavelets from minus infinity up to a certain scale j, if a wavelet spectrum is added to the scaling function spectrum, a new scaling function is produced with a spectrum twice as wide as the first. The first scaling function can therefore be expressed in terms of the second because all the information required is contained in the second scaling function, such that:

$$\varphi(2^j t) = \sum_k h_{j+1}(k) \varphi(2^{j+1} t - k) \qquad (14)$$

This relationship states that the scaling function, at a certain scale, can be expressed in terms of translated scaling functions at the next smaller scale, i.e., in more detail. Since the first scaling function replaced a set of wavelets, the wavelets can be expressed in terms of translated scaling functions at the next scale. The wavelet at level j becomes:

$$\psi(2^j t) = \sum_k g_{j+1}(k) \varphi(2^{j+1} t - k) \qquad (15)$$

Since signal f(t) can be expressed in terms of dilated and translated wavelets up to a scale j−1, f(t) can also be expressed in terms of dilated and translated scaling functions at scale j, as:

$$f(t) = \sum_k \lambda_j(k) \varphi(2^j t - k) \qquad (16)$$

If, in (16), we step up one scale to j−1, wavelets have to be added in order to keep the same level of detail.

$$f(t) = \sum_k \lambda_{j-1}(k) \varphi(2^{j-1} t - k) + \sum_k \gamma_{j-1}(k) \psi(2^{j-1} t - k) \qquad (17)$$

If the scaling function $\phi_{j,k}(t)$ and the wavelets $\psi_{j,k}(t)$ are orthonormal then the coefficients $\lambda_{j-1}(k)$ and $\gamma_{j-1}(k)$ are the inner products:

$$\lambda_{j-1}(k) = \langle f(t), \phi_{j,k}(t) \rangle$$

$$\gamma_{j-1}(k) = \langle f(t), \psi_{j,k}(t) \rangle \qquad (18)$$

If $\phi_{j,k}(t)$ and $\psi_{j,k}(t)$ are replaced by suitably scaled and translated versions, e.g., replace $2^j t$ in (14) and (15) by $2^j t - k$, and arrange terms:

$$\lambda_{j-1}(k) = \sum_m h(m - 2k) \lambda_j(m) \qquad (19)$$

$$\gamma_{j-1}(k) = \sum_m g(m - 2k) \gamma_j(m) \qquad (20)$$

These state that the wavelet coefficients and scaling function coefficients, on a certain scale, can be found by calculating a weighted sum of the scaling function coefficients from the previous scale.

Recall that the scaling function coefficients came from a low-pass filter and recall how a filter bank was iterated by repeatedly splitting the low-pass spectrum into a low-pass and a high-pass part. The filter bank iteration started with the signal spectrum. So, if we imagine that the signal spectrum is the output of a low-pass filter at the previous (imaginary) scale, then our sampled signal can be regarded as the scaling function coefficients from the previous (imaginary) scale. In other words, our sampled signal f(k) is equal to λ(k) at the largest scale.

A discrete weighted sum, as in (19) and (20), is the same as a digital filter. Since the coefficients $\lambda_j(k)$ come from the low-pass part of the splitted signal spectrum, the weighting factors h(k), in (19), form a low-pass filter. And since the coefficients $\lambda_j(k)$ come from the high-pass part of the splitted signal spectrum, the weighting factors g(k), in (20), form a high-pass filter. This means that (19) and (20) together form one stage of an iterated digital filter bank and the coefficients h(k) become the scaling filter and the coefficients g(k) the wavelet filter. In (19) and (20), the scaling and wavelet filters have a step-size of 2 in the variable k. The effect of this is a sub-sampling property that only every other $\lambda_j(k)$ is used in the convolution with the result that the output data rate is equal to the input data rate. The sub-sampling property solves the problem of how to choose the width of the scaling function spectrum.

Figure 11:
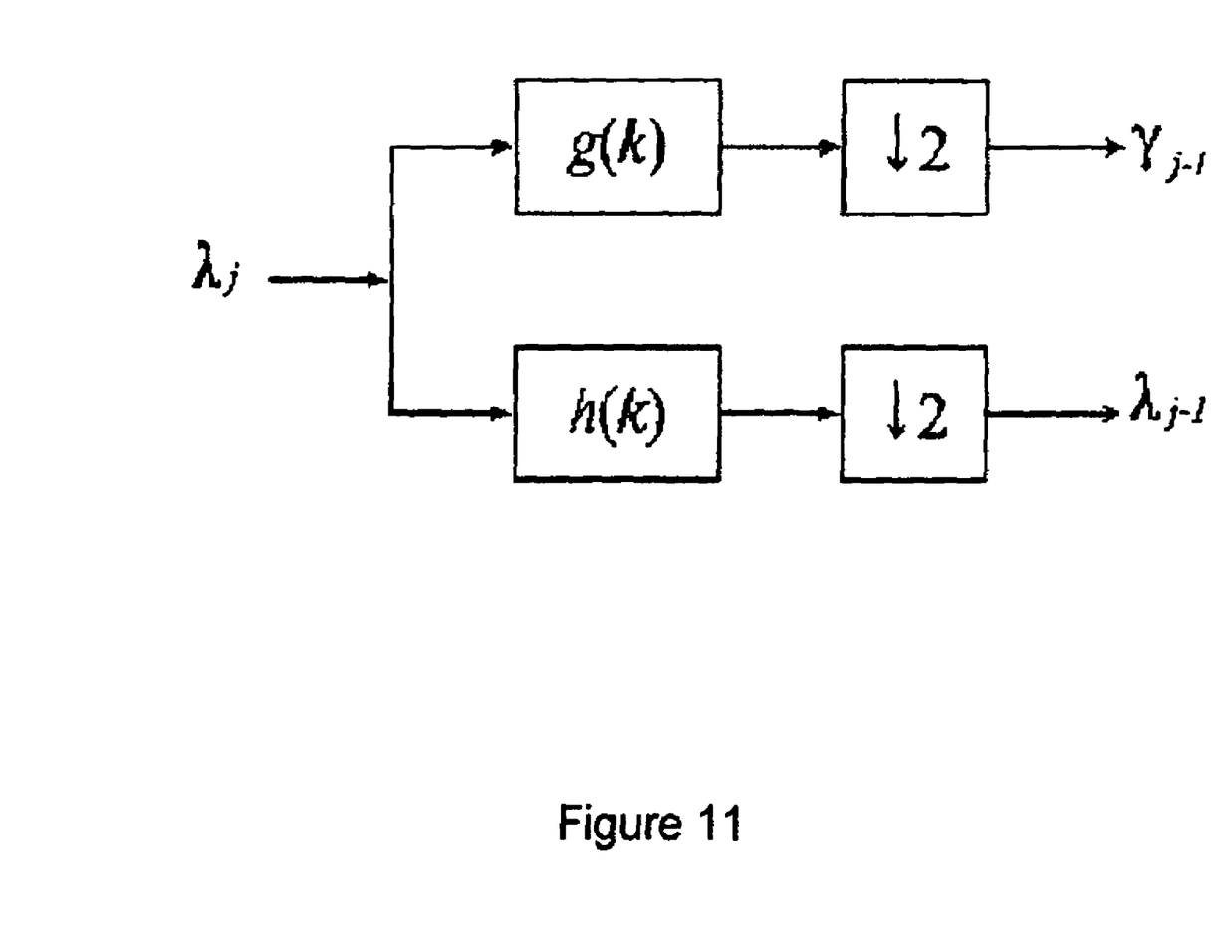
FIG. 11 illustrates one stage of an iterated filter bank.

Every time the filter bank is iterated the number of samples for the next stage is halved. Thus, you are left with just one sample (in the extreme case). This is where the iteration stops. This also determines the width of the spectrum of the scaling function. Normally the iteration stops where the number of samples becomes smaller than the length of the scaling filter or the wavelet filter, whichever is the longest. So the length of the longest filter determines the width of the spectrum of the scaling function. As such, (19) and (20) can be implemented as one stage of an iterated filter bank, illustrated in FIG. 11.

Thus, the highly redundant continuous wavelet transform with its infinite number of unspecified wavelets is reduced to a finite stage iterated digital filter bank easily implemented on a computer. Redundancy is removed by using discrete wavelets. A scaling function solves the problem of the infinite number of wavelets needed in the transformation.

The reader is encouraged to peruse one or all of the following. Kaiser, G., *A FRIENDLY GUIDE TO WAVELETS*, Boston: Birkhäuser, 1994, Weiss, L. G., *WAVELETS AND WIDE-BAND CORRELATION PROCESSING*, IEEE Signal Processing Magazine, January 1994, pp. 13-32. Sheng, Y., WAVELET TRANSFORM, in: *Transforms and Applications Handbook*. A. D. Poularikas (ed). pp. 747-827, Boca Raton, Fla. (USA): CRC Press, 1996 (The Electrical Engineering Handbook Series). Burrus, C. S., Gopinath, R. A., Guo, H., *INTRODUCTION TO WAVELETS AND WAVELET TRANSFORMS, A PRIMER*, Upper Saddle River, N.J. (USA): Prentice Hall, 1998. Hubbard, B. Burke, *THE WORLD ACCORDING TO WAVELETS*, Wellesey, Mass. (USA): A K Peters, 1996. Mallat, S. G., *A THEORY FOR MULTIRESOLUTION SIGNAL DECOMPOSITION: THE WAVELET REPRESENTATION*, IEEE Transactions on Pattern Analysis and Machine Intelligence, Vol. 11, No. 7 (1989), p. 674-693. And, Vetterli M. and C. Herley, *WAVELETS AND FILTER BANKS: THEORY AND DESIGN*, IEEE Transactions on Signal Processing, Vol. 40, No. 9 (1992), p. 2207-2232.

BRIEF SUMMARY

A method is disclosed for converting color images to textured monochrome images such that image regions with similar luminance but different chrominance look different when converted to black-and-white to preserve color information therein. This texture-encoded color information can be extracted at a later time to reconstitute the original color image. The present method involves first converting the color image to a luminance-chrominance colorspace. The chrominance data is decomposed into 4 channels of chrominance. A wavelet transformation of the luminance channel is preformed. Scaled chrominance channels are then mapped to a number of wavelet sub-bands. Once mapped, the wavelet transform is inverted to generate textures proportional to the original colors of the color image having an amplitude proportional to the chroma of the original color. The black-and-white image is embedded with this texture information into the image's grayscale component.

In order to retrieve the color image from the textured grayscale image, a wavelet transform regenerates the scaled chrominance channels mapped therein. Those wavelet sub-bands comprising embedded chroma are extracted and scaled to the size of the original image. The remaining sub-bands are inverted to produce the Y-image thereof. Separate images now exist in Y, Cr, and Cb. The recombination of the YCbCr images produce the colored image that was previously embedded into the grayscale components of the textured black-and-white image.

BRIEF DESCRIPTION OF THE DRAWINGS

The preferred embodiments and other aspects of the invention will become apparent from the following detailed description of the invention when read in conjunction with the accompanying drawings which are provided for the purpose of describing embodiments of the invention and not for limiting same, in which.

DESCRIPTION OF THE SPECIFICATION

A method is presented to convert color images to textured monochrome images such that image regions with similar luminance but different chrominance look different when converted to black-and-white in order to preserve color information within the black-and-white image.

Figure 1:
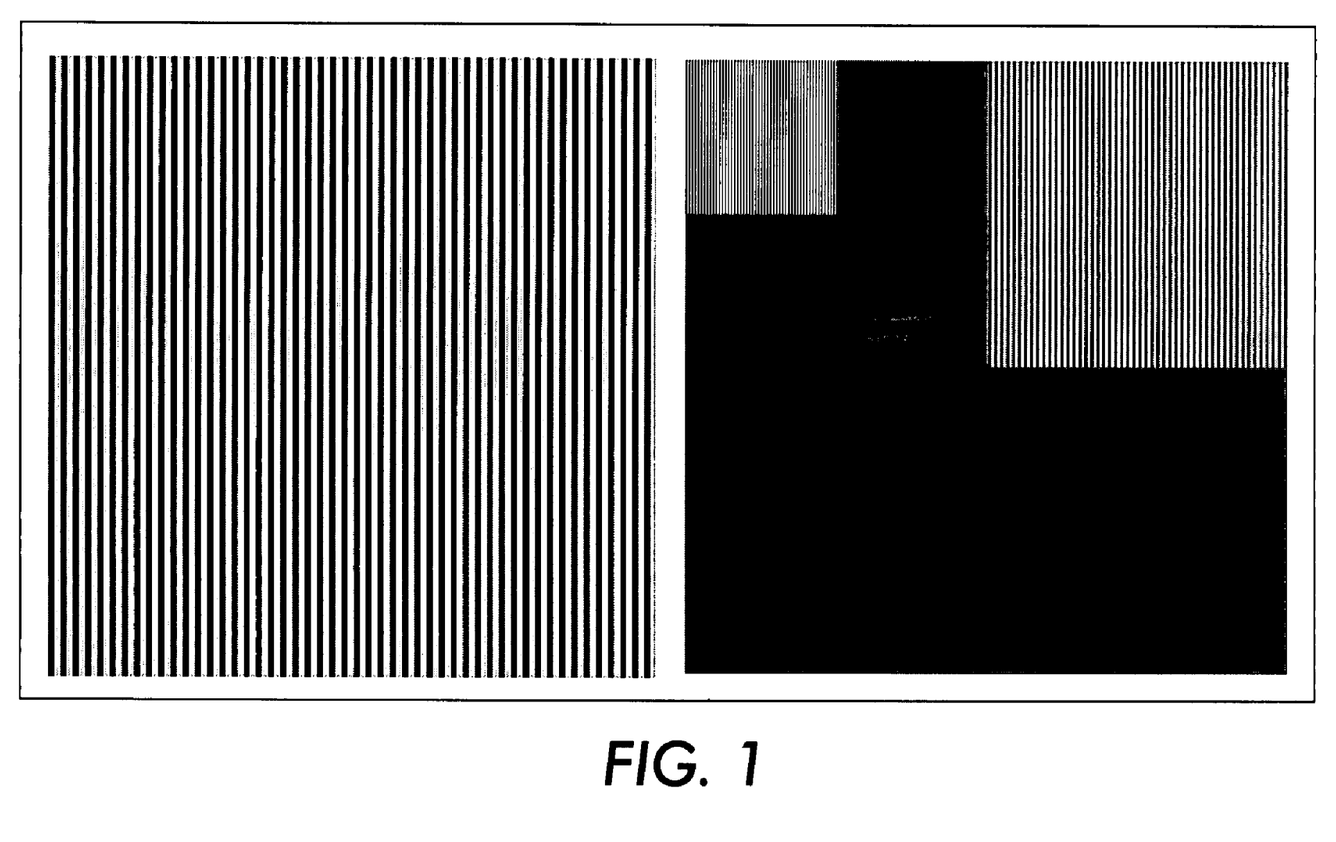
FIG. 1 shows an original striped image and its wavelet transform.

With reference now being made to FIG. 1, the present method involves first converting an original color image 10 from its colorspace into a luminance-chrominance colorspace comprising separate images of Y (luminance), Cr (chrominance red/green) and Cb (chrominance blue/yellow), shown at 12, 14, and 16 respectively. If the original colorspace was, for instance, RGB then the following conversion is preferably utilized to map the RGB colorspace into YCbCr space:

$Y=0.299R+0.587G+0.114B$ $Cb=-0.1687R-0.3313G+0.5B+128.$ $Cr=0.5R-0.4187G-0.0813B+128.$

After mapping, the images of the Y, Cr, and Cb are each the same size as the original. In other words, if the original image 10 is size 400×400 pixels, then each of the luminance-chrominance images (12, 14, 16) would be size 400×400 as well.

The Y-image 12, undergoes a wavelet transformation thereof to produce 18. Preferably, a quick transformation is used to map 8-bit images into 8-bit wavelets. If an 8-bit representation results in a blurring of lines, then a 16-bit or 32-bit is preferred. The wavelet transform separates various frequencies representative of information comprising the original color image. Note that the data of 18 is grouped into sub-bands (represented in the figure as blocks) and the frequency of the sub-bands generally increase from left-to-right and from top-to-bottom. In other words, the data of the upper-left sub-band $18A_1$ represents the lowest frequency while the data in 18D represents the highest frequency. Each of the sub-bands identified as $18A_1$, $18A_2$, $18A_3$, and $18A_4$, in the upper-left quadrant of 18 of FIG. 1, comprise the lower frequency data with each sub-quadrant thereof representing spatial information of the scaled-down original color image. The data contained in sub-band 18B in the upper-right quadrant represents vertical edge information. The data contained in sub-band 18C in the lower-left quadrant of 18 represents horizontal edge information. And, the data of sub-band 18D in the lower-right quadrant represents diagonal edge information.

The size of the data array comprising the wavelet transformed luminance image is the overall same size as the original image in pixels. If the original color image is, for instance, 400×400 pixels then the size of the wavelet transformed data array is also 400×400 pixels. Each of the sub-bands $18A_1$, $18A_2$, $18A_3$, and $18A_4$, in the upper-left quadrant are 1/16 the area of the original image. In this instance, each sub-band therein is 100×100 pixels each. Each of the other quadrants 18B, 18C, and 18D are 200×200 pixels each.

Reference is now being made to 20 and 22 of FIG. 1, wherein the Cr-image 14 of size 400×400 and the Cb-image 16 of size 400×400 are scaled down so that each can later be mapped to quadrants of the transformed data of 18. Cr-image 14 is thus scaled to ¼ the area to get Cr 20 comprising a ½ scaling in the vertical and a ½ scaling in the horizontal. The same is done to Cb-image 16 to get Cb 22. Such a scaling can be achieved by taking, for example, every other pixel in the vertical and every other pixel in the horizontal. Other ways of scaling an array to ¼ size are well known in the arts.

Reference is now being made to 24, 26, 28, and 30 of FIG. 1. Once the scaling has been done to Cr-image 14 and the Cb-image 16 to form scaled arrays 20 and 22, these values are separated into positive and negative components such that: Cr+=Cr*u(Cr); Cr−=−Cr*u(−Cr); Cb+=Cb*u(Cb); Cb−=−Cb*u(−Cb); where u(x) is a unit step function. The step function as used herein is such that positive values remain while negative values are zeroed. Thus, the Cr+ 24 comprises the Cr values of pixels with positive values and zeroed for the pixels with negative values. The Cr− 26 comprises absolute values of Cr for pixels with negative values and zeros for pixels with positive values. Similarly, the Cb+ 28 comprises the values for pixels with positive values and zeros for pixels with negative values. The Cb− 30 comprises absolute values of Cb with values of pixels with positive values zeroed.

The next step of the present invention involves mapping each chrominance channel Cr+ 24, Cr− 26, Cb+ 28, and Cb− 30 to sub-bands as shown. The number of sub-bands replaced with chrominance channels is minimally two, one for Cb and one for Cr although a single sub-band can be used for a hue correlate (since it is usually hue not chroma which carries the most information). Alternatively, three are mapped; one each for Cb and Cr and one for plane C=Cb*u(Cb)+Cr*u(−Cr). The C plane can be incorporated as an extra plane to replace yet another wavelet sub-band. Four sub-band replacements are preferred when the desire is to convert back to color at a future time.

As described in FIG. 1, the chrominance channels 24, 26, and 28 do not require any further scaling as their size corresponds to the size of the sub-band data which they replace. Channel 24 replaces the sub-band at 18 as 18B. Channel 26 replaces the sub-band at 18 as 18D. Channel 28 replaces sub-band 18C. Channel Cb− 30 is to be mapped to a wavelet sub-band which is ¼ the area. Again, this reduction can be achieved by a scaling of ½ in the vertical and ½ in the horizontal although other scaling techniques are known in the arts. Thus, Cb− channel 30 is further scaled to ¼ size, shown at 32, to fit the sub-band it replaces. The result of the sub-band replacements is shown at 34. Note that 3 of the 4 sub-bands comprising the upper-left quadrant, namely, those corresponding to $18A_1$, $18A_2$, and $18A_3$ retain their original values. Only $18A_4$ is replaced by the data of Cb− at 32. Alternatively, the sub-bands that are replaced by the various chrominance channels can be changed. Similarly, any of the channels can be rescaled and replaced at 32. Also, wavelets with more levels of decomposition can be used. This technique is not restricted to a two-level wavelet.

Once the sub-bands have been replaced by the chrominance channels, an inverse wavelet transform 36 is applied to generate textured image 38.

Figure 2:
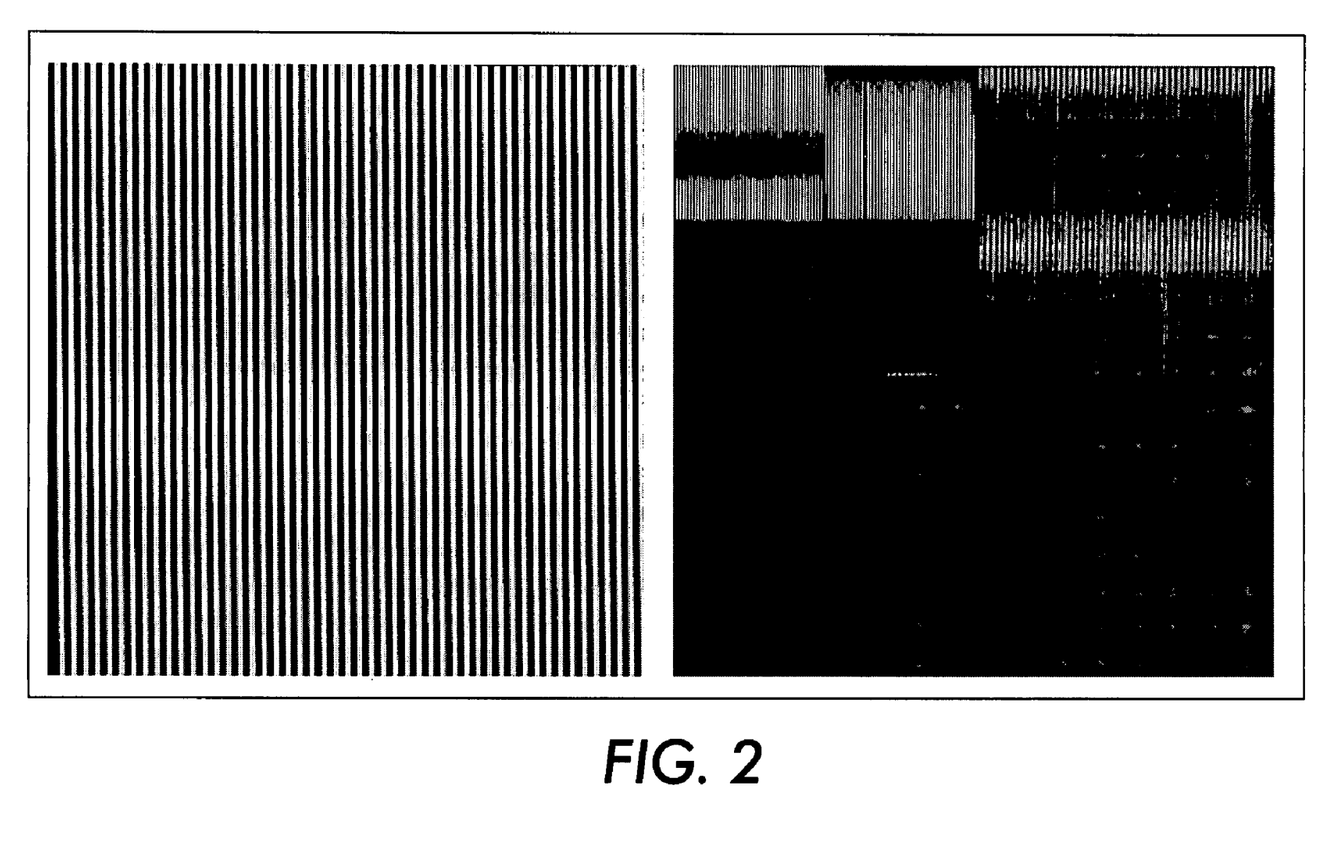
FIG. 2 shows an original, as in FIG. 1, with its striped image shifted by ½ degrees and its wavelet transform.
Figure 3:
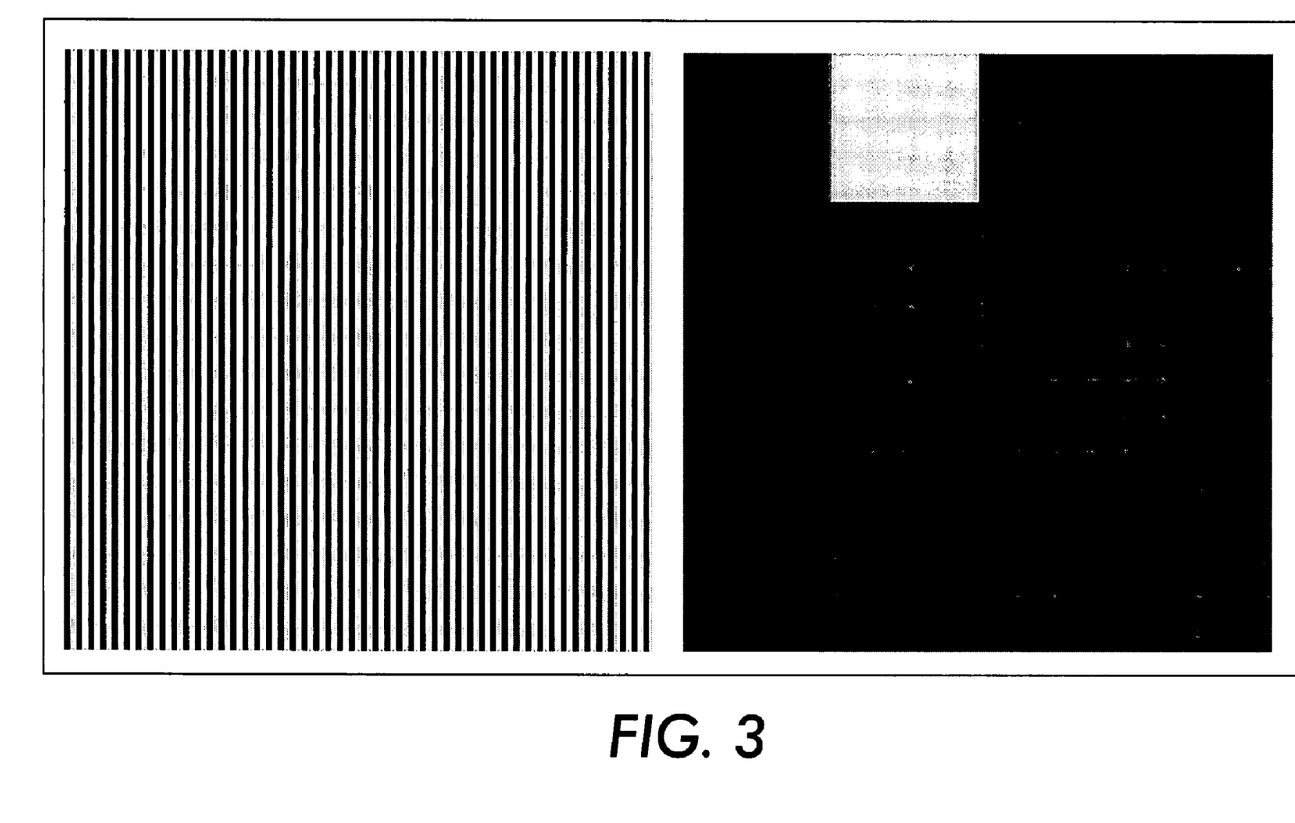
FIG. 3 shows an original high frequency striped image and its wavelet transform.
Figure 4:
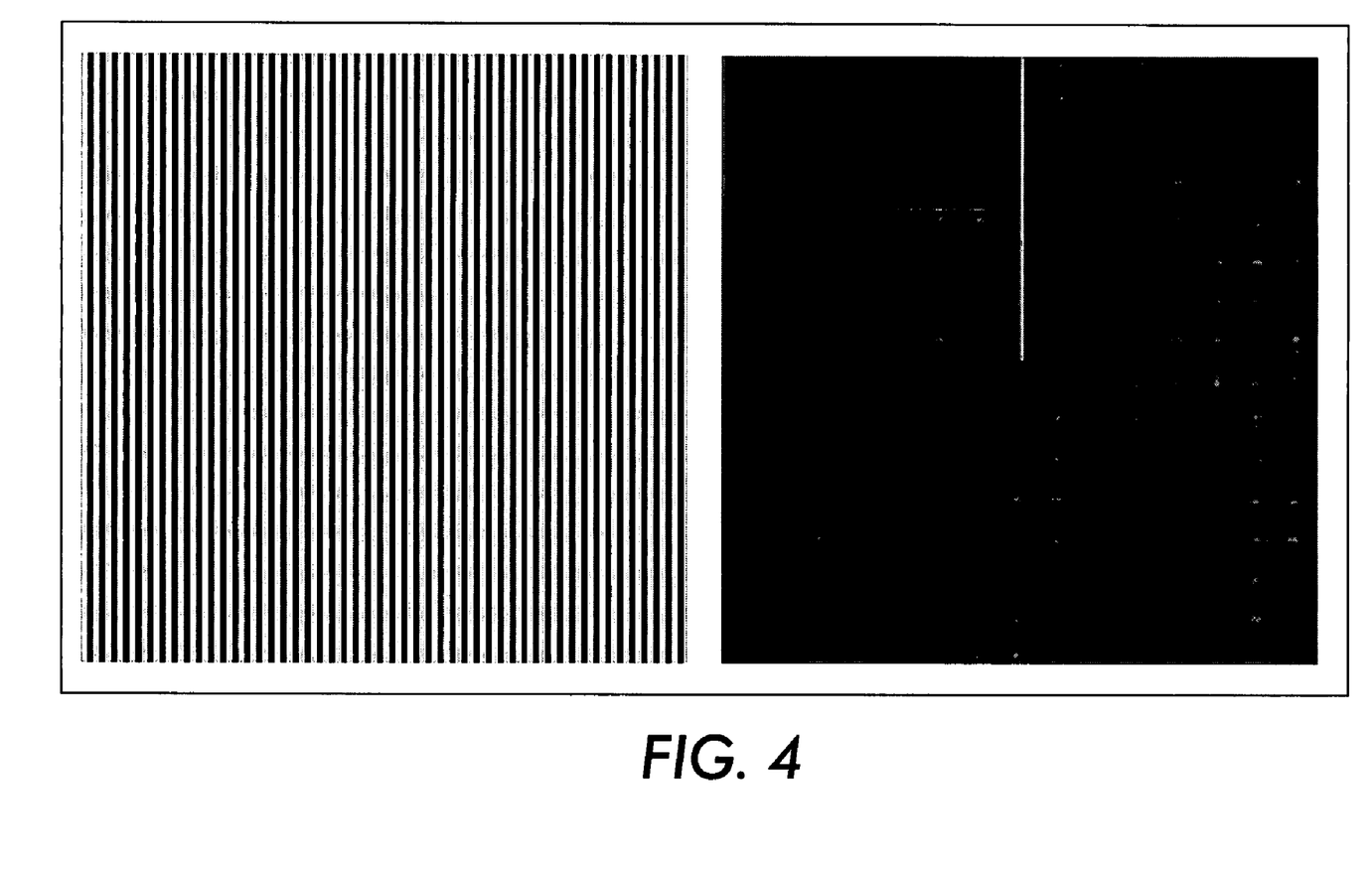
FIG. 4 shows an original, as in FIG. 3, with its high frequency striped image shifted and its wavelet transform.
Figure 5:
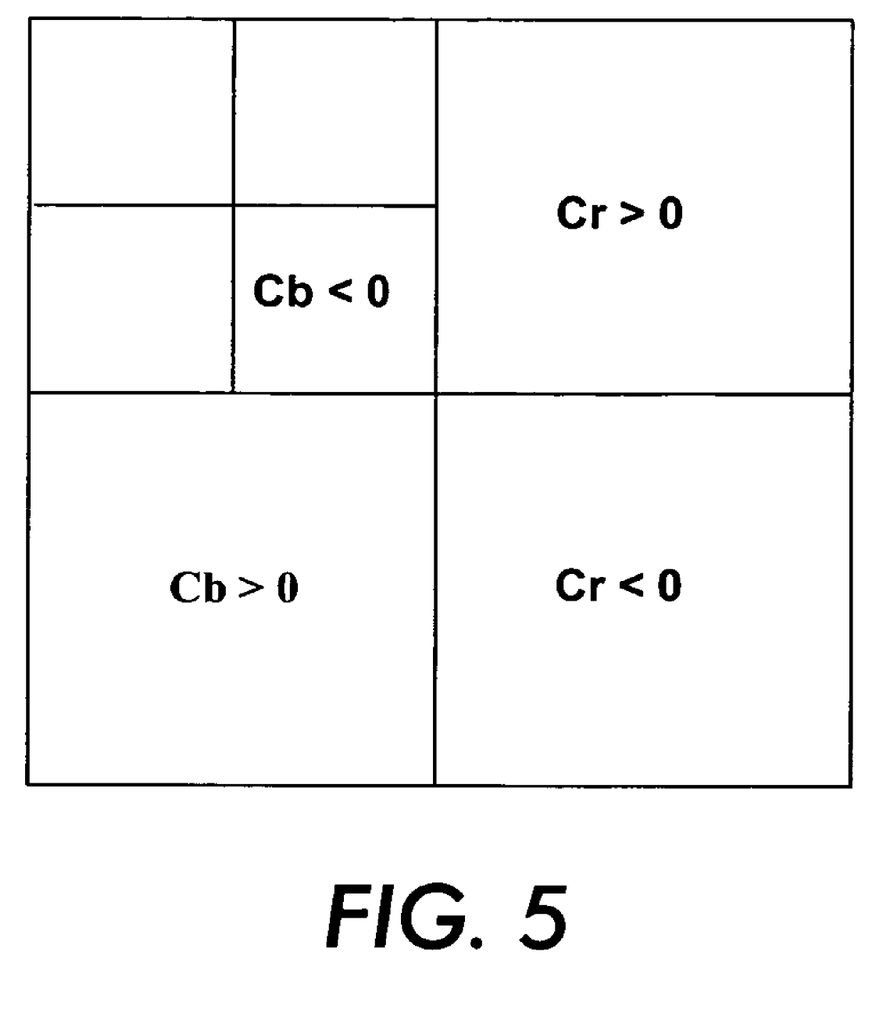
FIG. 5 shows wavelet transformation decomposition (two levels) and subband replacement.
Figure 6:
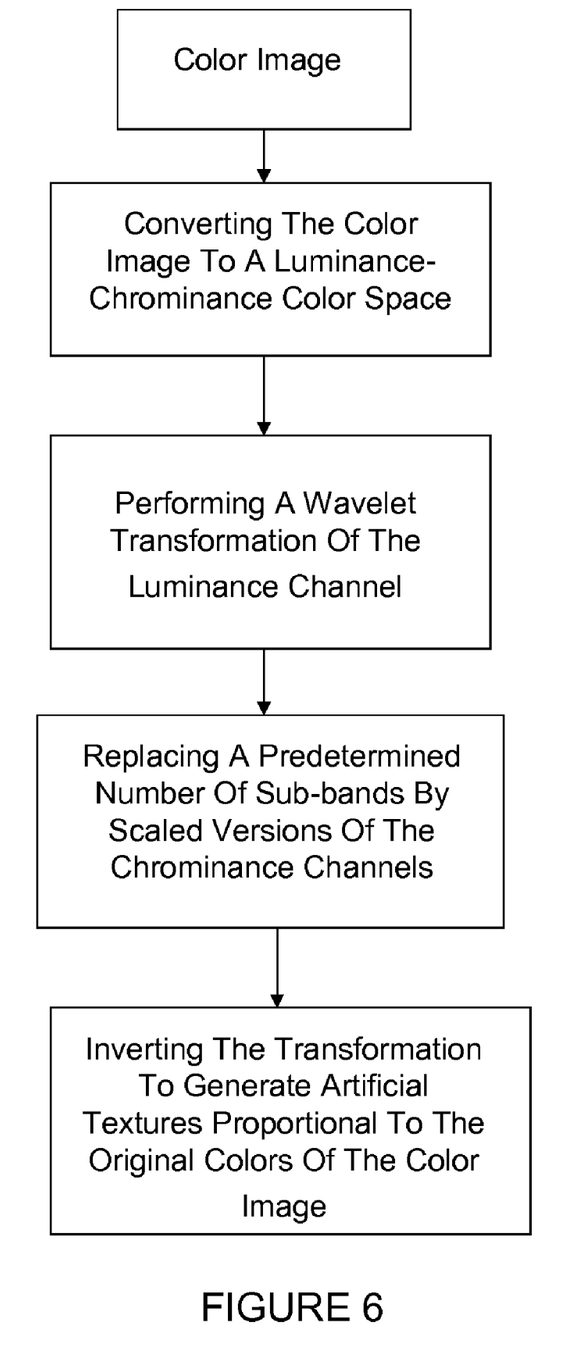
FIG. 6 is a flowchart showing converting color images to textured monochrome images.

Attention is now directed to FIG. 2. To recover the color image from textured image 38, a wavelet transformation 40 thereof produces wavelet sub-bands collectively at 41. This essentially corresponds to 34 of FIG. 1 although a small error may creep into the data depending on the precision of the method of calculation used. The Cb+, Cb−, Cr+, Cr− channels are extracted. Thus, sub-band Cr+ (41B) is extracted to Cr+ at 42. Sub-band Cr− (41D) is extracted to Cr− at 44. Sub-band Cb+ (41C) is extracted to Cb+ at 46. Sub-band Cb− ($41A_4$) is extracted and scaled to become Cb− at 48.

The absolute values of Cb+ Cb− Cr+ Cr− are taken and used to recompose Cb=|Cb+|−|Cb−| and Cr=|Cr+|−|Cr−|. Thus, channel 42 is combined with channel 44 to recompose Cr-image 50. Likewise, channels 46 and 48 are combined to recompose Cb-image 52. Then each of these channels is scaled to match the size of the original image. Thus, Cr 50 is scaled to Cr-image 56 and Cb 52 is scaled to Cb-image 58.

With reference now being made to 54, once the sub-bands have been extracted, these sub-bands are set to contain all zeroes. The other remaining sub-bands corresponding to $18A_1$, $18A_2$, and $18A_3$ still contain data. At 60, an inverse transform of this data in 54 produces Y-image 62.

Post-processing is preferably applied to luminance Y and chrominance Cb Cr to remove noise, increase saturation, improve contrast, or sharpen, as the process of half-toning, printing, and scanning tends to degrade these characteristics.

The recomposition of components Y-image 62, Cr-image 56 and Cb-image 58 form the image, shown collectively at 64, now in YCbCr colorspace. This colorspace can be subsequently mapped to RGB or another colorspace, if desired.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method for converting color images to textured monochrome images such that regions with similar luminance but different chrominance appear different when converted to black-and-white, comprising:
   a) converting the color image to a luminance-chrominance color space;
   b) performing a wavelet transformation of the luminance channel;
   c) replacing a predetermined number of sub-bands by scaled versions of the chrominance channels; and
   d) inverting the transformation to create a black-and-white image having artificial textures proportional to colors in the color image.

2. A method, as defined in claim 1, wherein the luminance-chrominance color space is either YCbCr or Lab.

3. A method, as defined in claim 1, further comprising mapping neutral colors to neutral wavelet coefficient values.

4. A method, as defined in claim 1, further comprising replacing colors that are significantly different with significantly different textures.

5. A method, as defined in claim 1, wherein the number of sub-bands replaced is minimally two, one for Cb and one for Cr.

6. A method, as defined in claim 1, further comprising incorporating a C plane into the image as an extra chrominance plane that can be used to replace yet another sub-band with C incorporating only positive (or negative) values of either Cb or Cr.

7. A method, as defined in claim 1, further comprising decomposing the chrominance into 4 channels having positive and negative values, such that: Cb+=Cb u(Cb); Cb−=−Cb u(−Cb); Cr+=Cr u(Cr); Cr−=−Cr u(−Cr).

8. A method, as defined in claim 1, further comprising decomposing the chrominance into any number of channels, from 1 to N−1, where N is the total number of sub-bands wherein the channels represent chrominance information in the original image.

9. A method, as defined in claim 1, further comprising, preserving the wavelet coefficients with the largest magnitude either coming from the wavelet transform or from the chrominance plane.

10. A method, as defined in claim 9, further comprising using the following for preserving said largest magnitude coefficients: new_wavelet(b,i,j)=max(old_wavelet(b,i,j), chrominance(i,j)).

11. A method for recovering a color image from a black-and-white image embedded with chrominance information reproduced from the color image, comprising:
   a) obtaining electronic image data of the black-and-white image embedded with chrominance information applying a first transformation to the electronic image data;
   b) calculating wavelets from the first transformed data;
   c) recovering chrominance information from the calculated wavelets;
   d) recovering luminance information from the calculated wavelets; and
   e) combining the recovered chrominance and luminance information to create a color image corresponding to the black-and-white image embedded with chrominance information.

12. A method, as in claim 11, wherein the encoded chrominance information comprises a plurality of wavelet sub-bands.

13. A method, as in claim 11, wherein the encoded chrominance information comprises positive and negative values of Cr and positive and negative values of Cb.

14. A method, as in claim 11, wherein the applied first transformation comprises a distortion-correcting affine transform.

15. A method, as in claim 11, wherein the recovering of chrominance information comprises recombining positive and negative values of Cb and positive and negative values of Cr.

16. A method, as in claim 12, wherein the recovering of luminance information comprises zeroing all chrominance-loaded wavelet sub-bands.

17. A method, as in claim 11, wherein the first transformation comprises sharpening the image before calculating wavelets therefrom to account for printing and scanning resolution, degradation, and defects.

18. A method, as in claim 11, wherein the recovering of luminance information and chrominance information comprises an inverse transformation thereof.

19. A method, as in claim 11, further comprising a post-processing transformation of the color image.

20. A method, as in claim 19, wherein the transformation comprises increasing the saturation of said color image.

21. A method, as in claim 19, wherein the transformation comprises applying a sharpening filter to said recovered luminance information to counteract any loss of sharpness.

22. A method, as in claim 19, wherein the transformation comprises applying a noise-reducing filter to said recovered chrominance to reduce noise introduced by the reconstruction of the color image.

23. A system for recovering a color image from a black-and-white image reproduced from the color image, comprising:
   a processor; and
   a scanner for obtaining electronic image data of the black-and-white image;
   said processor applying a first transformation to the electronic image data;
   said processor calculating wavelets from the first transformed data;
   said processor recovering chrominance information from the calculated wavelets;
   said processor recovering luminance information from the calculated wavelets;
   said processor combining the recovered chrominance and luminance information to create a color image corresponding to the black-and-white image embedded with chrominance information.

24. A system, as in claim 23, wherein the encoded chrominance information comprises a plurality of wavelet sub-bands.

25. A system, as in claim 23, wherein the encoded chrominance information comprises positive and negative values of Cr and positive and negative values of Cb.

26. A system, as in claim 23, wherein the applied first transformation comprises a distortion-correcting affine transform.

27. A system, as in claim 23, wherein the recovering of chrominance information comprises recombining positive and negative values of Cb and positive and negative values of Cr.

28. A system, as in claim 27, wherein the recovering of luminance information comprises zeroing all loaded wavelet sub-bands.

29. A system, as in claim 28, wherein the first transformation comprises sharpening the image before calculating wavelets therefrom to account for printing and scanning resolution, degradation, and defects.

30. A system, as in claim 28, wherein the recovering of luminance information and chrominance information comprises an inverse transformation thereof.

31. A system, as in claim 28, further comprising a post-processing transformation of the color image.

32. A system, as in claim 31, wherein the transformation comprises increasing the saturation of said color image.

33. A system, as in claim 31, wherein the transformation comprises applying a sharpening filter to said recovered luminance information to counteract any loss of sharpness.

34. A system, as in claim 31, wherein the transformation comprises applying a noise-reducing filter to said recovered chrominance to reduce noise introduced by the reconstruction of the color image.

* * * * *